US009807674B1

(12) United States Patent
Yu

(10) Patent No.: US 9,807,674 B1
(45) Date of Patent: Oct. 31, 2017

(54) AUTONOMOUS PAIRING OF INTERNET OF THINGS DEVICES UTILIZING BROADCAST PACKETS

(71) Applicant: Chengfu Yu, Irvine, CA (US)

(72) Inventor: Chengfu Yu, Irvine, CA (US)

( * ) Notice: Subject to any disclaimer, the term of this patent is extended or adjusted under 35 U.S.C. 154(b) by 0 days.

(21) Appl. No.: 15/649,316

(22) Filed: Jul. 13, 2017

(51) Int. Cl.
   *H04W 48/10* (2009.01)
   *H04W 12/06* (2009.01)
   *H04L 29/08* (2006.01)
   *H04L 29/06* (2006.01)

(52) U.S. Cl.
   CPC ............ *H04W 48/10* (2013.01); *H04L 63/08* (2013.01); *H04L 67/36* (2013.01); *H04W 12/06* (2013.01); *H04L 67/12* (2013.01); *H04L 69/161* (2013.01)

(58) Field of Classification Search
   CPC ...... H04L 67/12; H04W 12/02; H04W 12/06; H04W 12/08; H04W 76/02; H04W 84/12; H04W 84/18
   See application file for complete search history.

(56) References Cited

U.S. PATENT DOCUMENTS

| 8,259,691 | B2 | 9/2012 | Zimmerman et al. | |
| 2015/0071052 | A1* | 3/2015 | Hershberg | H04W 24/04 370/216 |
| 2015/0121470 | A1* | 4/2015 | Rongo | H04L 41/0813 726/4 |
| 2015/0133108 | A1* | 5/2015 | Ahmed | H04W 4/008 455/420 |
| 2015/0181505 | A1* | 6/2015 | Deng | H04W 48/10 713/160 |
| 2015/0223277 | A1* | 8/2015 | Jovicic | H04B 10/116 455/41.2 |
| 2015/0251102 | A1* | 9/2015 | Kuo | A63F 13/215 463/35 |
| 2016/0301540 | A1* | 10/2016 | Francescangeli | H04L 12/2809 |
| 2016/0323689 | A1* | 11/2016 | Goluboff | H04L 63/0823 |

OTHER PUBLICATIONS

"Evaluation of Reliable UDP-Based Transport Protocols for Internet of Things (IoT)"; 2016 IEEE Symposium on Computer Applications & Industrial Electronics (ISCAIE); Masirap et al; May 30, 2016; 978-1-5090-1543-6/16.*

* cited by examiner

Primary Examiner — Benjamin H Elliott, IV

(57) ABSTRACT

A human-machine interface system is disclosed. The human-machine interface includes a user interface configured to receive a user input where the user input includes network access credentials of an access point; a processing system configured to identify the access point as an access point of interest, where to identify the access point of interest is to create a first plurality of UDP packets where a respective length of each of the first plurality of UDP packets is defined according to a mathematical formula. The human-machine interface system further includes a transmitter, configured to transmit the first plurality of the UDP packets, where the transmitter utilizes the unicast transmission protocol or the multicast transmission protocol or the broadcast transmission protocol.

25 Claims, 8 Drawing Sheets

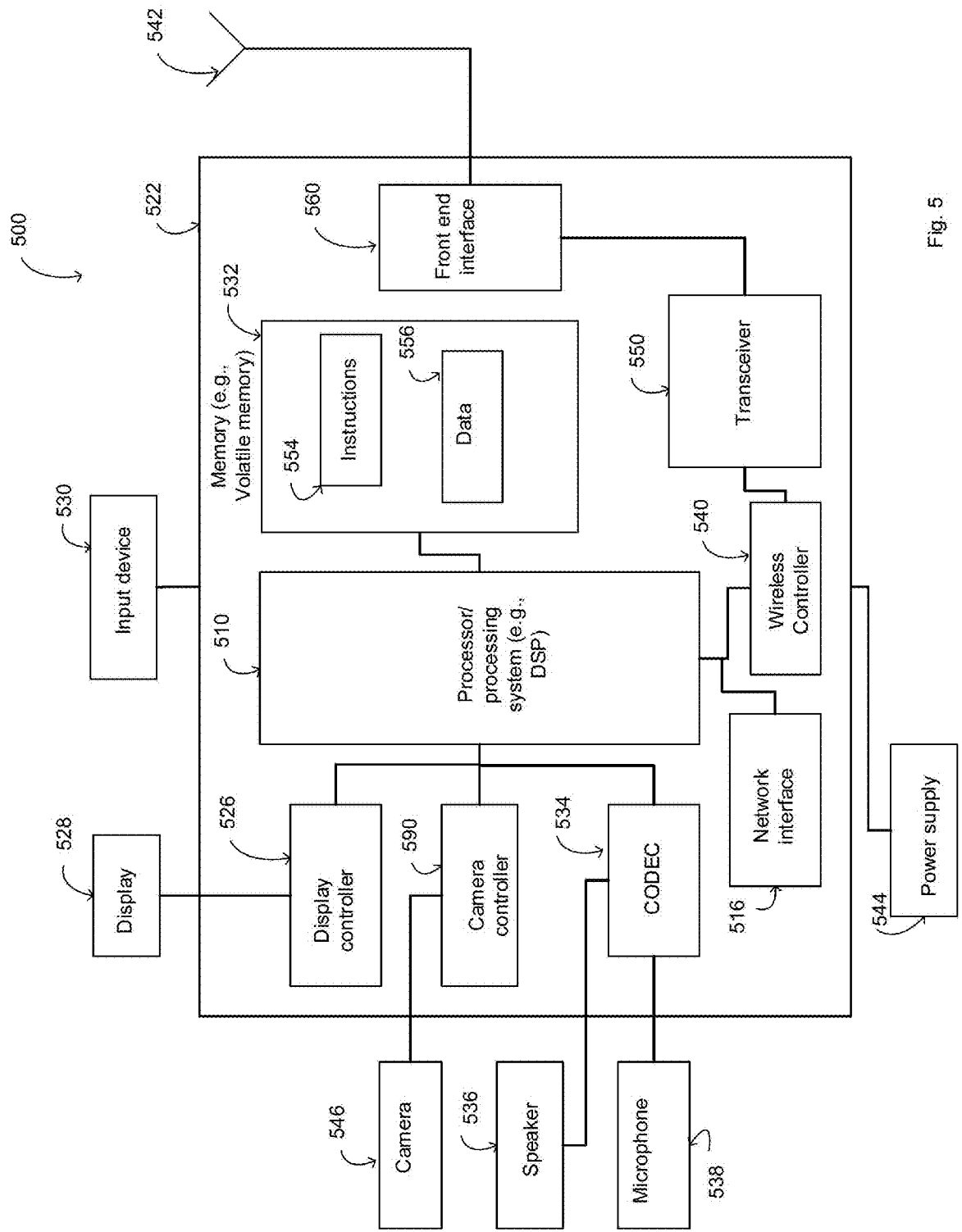

AUTONOMOUS PAIRING OF INTERNET OF THINGS DEVICES UTILIZING BROADCAST PACKETS

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD. Nonprovisional patent application Ser. No. 15/620,749 filed on Jun. 12, 2017; and entitled SMART REGISTER DEVICE AND METHOD. Nonprovisional patent application Ser. No. 15/625,601 filed on Jun. 16, 2017; and entitled SMART FAN AND VENTILLATION DEVICE AND METHOD.

TECHNICAL FIELD

The present disclosure generally relates to internet of things (IoT) devices and in particular, for example, to pairing of the IoT devices in a WiFi™ network.

BACKGROUND

The WiFi™ standard (e.g., IEEE 802.11) is evolving and has multiple revisions. The market has a number of WiFi™ routers based on different revisions of the WiFi™ standard. For example, some routers block user datagram packets (UDP) when transmitted as multicast packets. As another example, some of the routers of later revisions of the WiFi™ standard employ multiple-input-multiple-output (MIMO) technology, utilizing antenna diversity for robust transmission and reception of WiFi™ signals. While the revisions are addressing issues that arise from older revisions and provide improvements to the technology, they also present new challenges for existing systems built around older revisions. Accordingly, there is a need in the art to address the challenges arising from newer revisions of the WiFi™ standard and provide new systems to address these challenges.

SUMMARY

The disclosed subject matter relates to a human-machine interface system including a user interface configured to receive a user input where the user input includes network access credentials of an access point; a processing system configured to identify the access point as an access point of interest, where to identify the access point of interest is to create a first plurality of UDP packets where a respective length of each of the first plurality of UDP packets is defined according to a mathematical formula. The human-machine interface system further includes a transmitter, configured to transmit the first plurality of the UDP packets, where the transmitter utilizes the unicast transmission protocol or the multicast transmission protocol or the broadcast transmission protocol.

The disclosed subject technology also relates to a method including: receiving user input on a user interface of a wireless user device, where the user input comprises wireless network access credentials; creating a first plurality of UDP packets; where a respective length of each of the first plurality of UDP packets is defined according to a mathematical, formula; transmitting the first plurality of UDP packets, where the transmitting utilizes the unicast transmission protocol or the multicast transmission protocol or the broadcast transmission protocol; receiving, by a wireless device, the first plurality of UDP packets; and processing the first plurality of UDP packets where the processing yields a fixed number and associating the fixed number with an access point of interest.

The disclosed subject technology further relates to a non-transitory machine-readable medium comprising instructions stored therein, which, when executed by one or more processors of a processing system cause the one or more processors to perform operations including: receiving user input on a user interface of a wireless user device, where the user input comprises wireless network access credentials; creating a first plurality of UDP packets where a respective length of each of the first plurality of UDP packets is defined according to a mathematical formula; transmitting the first plurality of UDP packets; creating a second plurality of UDP packets, where the second plurality of the UDP packets are indicative of the network access credentials; and transmitting the second plurality of UDP packets.

It is understood that other configurations of the subject technology will become readily apparent to those skilled in the art from the following detailed description, wherein various configurations of the subject technology are shown and described by way of illustration. As will be realized, the subject technology of other different configurations and its several details are capable of modifications in various other respects, all without departing from the subject technology. Accordingly, the drawings and the detailed description are to be regarded as illustrative in nature and not restrictive.

BRIEF DESCRIPTION OF DRAWINGS

Certain features of the present disclosure are set forth in the appended claims. However, for purpose of explanation, several implementations of the present disclosure are set forth in the following figures.

FIG. 5 illustrates conceptually an example electronic system with which some implementations of the present disclosure may be implemented.

Figure 1:
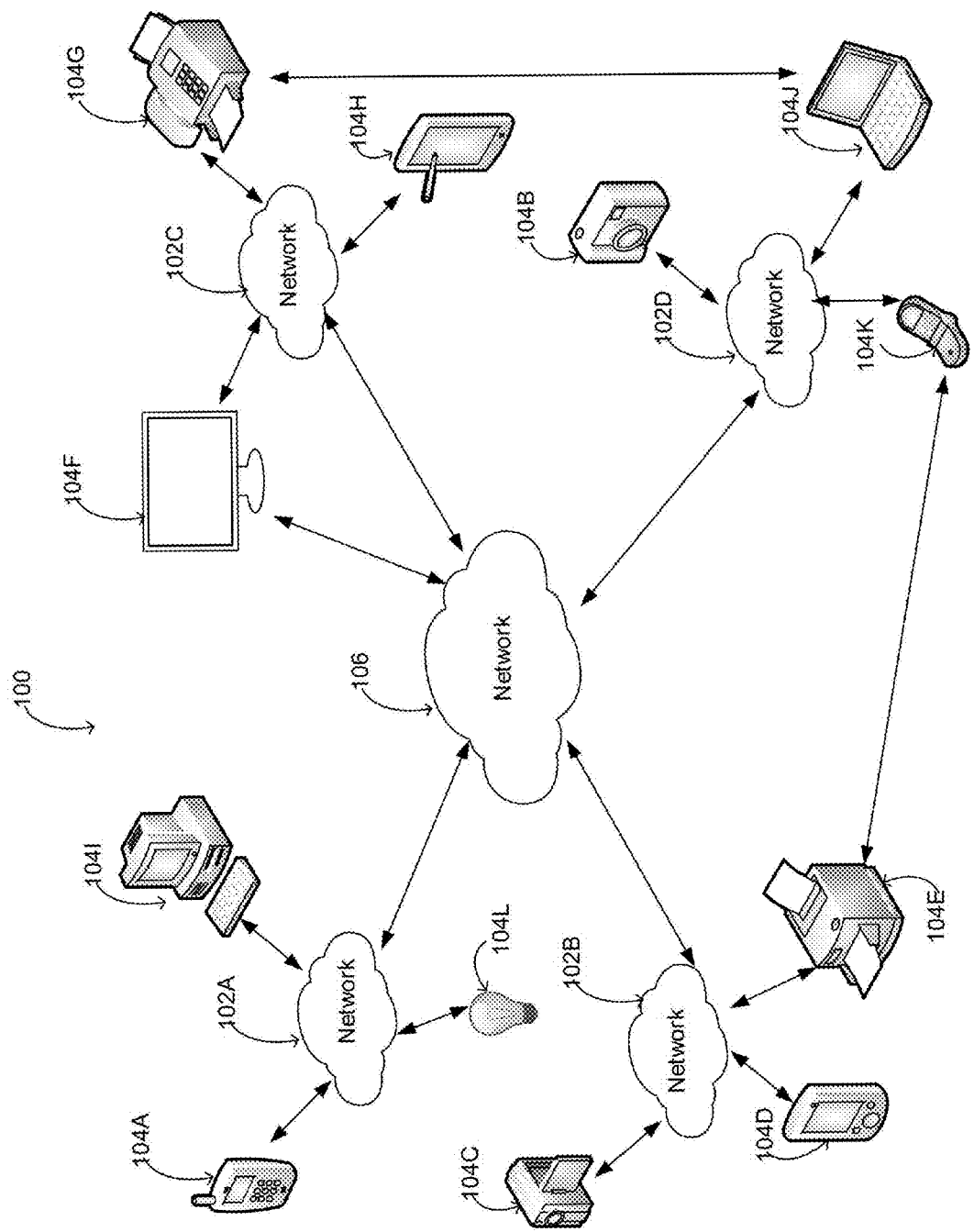
FIG. 1 illustrates an exemplary network environment for implementing an IoT system in accordance with one or more embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

The detailed description includes specific details for the purpose of providing a thorough understanding of the present disclosure. However, the present disclosure is not limited to the specific details set forth herein and may be practiced without these specific details. In some instances, structures and components are shown in block diagram form to avoid obscuring the concept of the present disclosure.

As noted above, some routers block user datagram packets (UDP) when they are transmitted as multicast packets, resulting in a limitation of utilizing the low-order 23 bits of the multicast address to communicate network access credentials. The present disclosure addresses this issue and discloses a system to transmit user datagram packets (UDP) as broadcast packets. The system is configured to identify an access point as an access point of interest utilizing a first plurality of UDP packets from a wireless user device to an IoT device and communicating the network access credentials to an IoT device utilizing a second plurality of UDP packets, where both the first plurality of UDP packets and the second plurality of the UDP packets are transmitted as broadcast packets.

In one or more implementations, the first plurality of UDP packets is based on network access credentials of an access point and a plurality of lengths of the first plurality of UDP packets defined in accordance to a mathematical formula that is known to both the user wireless device and the IoT device. Upon reception of the first UDP packets by the IoT device, an access point is identified as the access point of interest based on processing the mathematical formula and the first plurality of UDP packets. Additionally, to identify an access point as the access point of interest is to deduce a fixed number and to associate the fixed number with the access point of interest. In one or more implementations, the wireless network access credentials include at least a passphrase word and an SSID word for the access point of interest is determined from the knowledge of the BSSID of the access point of interest, where the BSSID is deduced from the first plurality of UDP packets.

In some aspects of the technology, to create the second plurality of the UDP packets is to program a 10-bit word, where six bits of the 10-bit word are dedicated to sequencing and 4 bits of the 10-bit word are dedicated to information and where the network access credentials are American Standard Code for Information Interchange (ASCII) code encoded. The maximum transmission unit (MTU) is the maximum length of data (payload) that can be transmitted by a protocol in one instance. For example, the WiFi™ standard has a 1500 bytes MTU, of which 1460 bytes are the maximum payload size allowable to be transmitted per packet. According to the subject technology, a 10-bit word yields 1024 10-bit word bytes (equivalent to 1280 8-bit words bytes). The 10-bit word bytes are within the MTU of 1460 bytes. Accordingly, any word that is equal or less than 10-bit word will, yield a total number of bytes within the MTU maximum of 1460 bytes.

For example, by way of illustration only and not by way of limitations, the 10-bit word is divided into 6-bits dedicated to sequencing, and 4-bit dedicated to information related to network access credentials. According to this division, a maximum of 1024 10-bit words bytes are generated. The 6-bit word provides 64 unique sequence numbers and a total of 32 8-bit words (or bytes). In one or more implementations, the 32 bytes are divided as follows: 1 byte is dedicated to the total length of the packet, 2 bytes are dedicated to the length of the passphrase from a wireless access credentials, 2 bytes are dedicated to a cyclic redundancy check (e.g., CRC8), and 27 bytes are dedicated to the characters of the wireless access credentials password. To illustrate, a choice of a 10-bit word according to the above distribution and division will allow a password no larger than 27 characters of the total 32 bytes.

In one or more implementations, the 10-bit word may be divided into 8-bits dedicated to sequencing and 2-bits dedicated to information. In this scenario the 8-bit word provides 256 unique sequence numbers and a total of 64 8-bit words (or bytes). The 64 bytes are divided as follows: 1 byte is dedicated to the total length of the packet, 2 bytes are dedicated to the length of the passphrase from a wireless access credentials, 2 bytes are dedicated to a CRC code, and 59 bytes are dedicated to the actual characters of the wireless access credentials passphrase. In this scenario, a choice of a 10-bit word according to the above distribution and division will allow a passphrase no larger than 59 characters of the total 64 bytes.

FIG. 1 illustrates an exemplary network environment 100 for implementing an IoT system in accordance with one or more embodiments of the present disclosure. Not all of the depicted components may be required. However, one or more implementations may require additional components, fewer components or different component not shown in network environment 100. Thus, any variations in network environment 100 may be implemented without departing from the scope of the present disclosure.

Network environment 100 may be a number of networks such as an IoT network, a private network, the internet, any other network, or combinations thereof. The network environment 100 includes networks 102A, 102B, 102C, 102D (hereafter referred to as 102A-102D) and 106. Network environment 100 includes a number of electronic devices 104A, 104B, 104C, 104D, 104E, 104F, 104G, 104H, 104I, 104J, 104K, 104L (hereafter referred to as 104A-104L). One or more of the devices 104A-104L, such as device 104A, may be a device capable of communicating with one or more of devices 104A-104L (e.g., via wired or wireless communication). In some aspects, the devices 104A-104L may include, may be embedded, in, or may be coupled to a portable communication device, such as a mobile phone, a laptop, a tablet or any other communication device. The devices 104A-104L may be communicably coupled to one or more of the networks 102A-102D, 106 and/or to one or more other devices of the devices 104A-104L. As depicted in FIG. 1 examples of devices 104A-104L may include a computer, a desktop, a laptop, a tablet, a fax machine, a printer, light bulb and so forth.

One or more of the networks 102A-102D and 106 include one or more wired or wireless devices that facilitate devices communication, such as router devices, switch devices, relay devices, etc., and/or include one or more servers. One or more of the networks 102A-102D and 106, such as network 106 may be, or may include, a cloud of computers. One or more of the networks 102A-102D and 106 may be a local area network that communicatively couples one or more of the devices 104A-104D. In one or more implementations, one or more of networks 102A-102D and 106 may be referred to as an IoT network and/or a machine-to-machine (M2M) network.

One or more of the devices 104A-104L may be referred to as an IoT device and/or an M2M device and may include human-machine interface (HMI) applications and machine-interface applications. There may be multiple paths between one or more of the devices 104A-104L and/or one or more of the networks 102A-102D. One or more of the networks 102A-102D and 106 and/or devices 104A-104D are able to communicate with one another or other systems. One or more of the devices 104A-104L may include or may be a sensor that measures a physical quantity from surrounding environment and convert physical quantities into a signal. Examples of sensors include, by way of illustration only and not by way of limitation, temperature sensors, video cameras, audio recorders, motion sensors, humidity sensors, smoke detectors and other sensors.

In one or more implementations, devices 104A-104L may include one or more of active devices, passive devices and/or implemented wholly or partially as system on chip devices. Devices 104A-104L may include a transmitter, a receiver, a Global Positioning System (GPS), a Bluetooth (BT)/BLE transceiver and/or a WiFi™ transceiver. In one or more implementations, networks 102A-102D and 106 may include one or more network access points, such as a wireless access point (WAP) where the WAP is capable of transmitting a user datagram packet (UDP), where networks 102A-102D and 106 do not need to have a pre-established network connection with receiving devices to transmit the UDP packet.

Figure 2A:
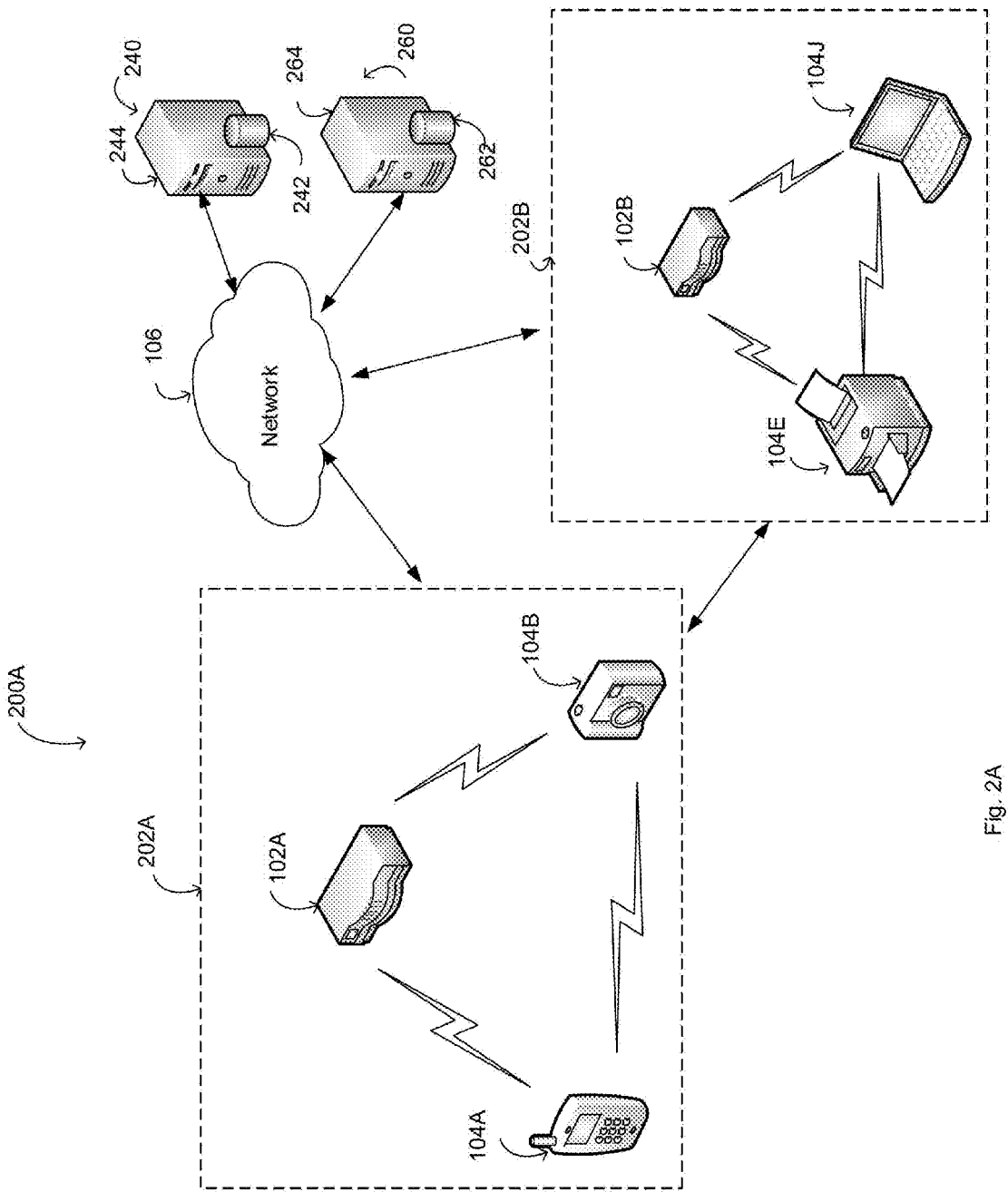
FIG. 2A illustrates an exemplary network environment to identify an access point of interest in accordance with one or more embodiments of the present disclosure.

FIG. 2A illustrates an exemplary network environment 200A to identify an access point of interest 102A in accordance with one or more embodiments of the present disclosure. Network environment 200A includes wireless local area network 202A, wireless local area network 202B, network 106, and servers 240 and 260. For example, by way of illustration only and not by way of limitation, wireless local area network area 202A may include IoT devices 104A and 104B and wireless access point 102B and wireless local area network area 202B may include IoT devices 104E and 104J and wireless access point 102B. Servers 240 and 260 may include computing devices 244 and 264 and computer-readable storage devices 242 and 262. The network environment 200 includes a wireless access point 102A that facilitates communication between IoT devices 104A and 104B, and wireless access point 102B that facilitates communication between IoT devices 104E and 104J. Nevertheless, devices within local area network 202A such as IoT device 104B might view both local area network 202A and 202B prior to being associated with a specific local area network such as 202A.

In some aspects, network environment 200 may be a distributed client/server system that spans one or more networks such as, for example, network 106. Network 106 can be a large computer network such as, for example, wide area network (WAN), the Internet, a cellular network, or a combination thereof connecting any number of mobile clients, fixed clients, and servers. Further, the network 106 can include, but is not limited to, any of the following network topologies, including a bus network, a star network, a ring network, a mesh network, a star-bus network, tree or hierarchical network, and the like. In some aspects, communication between IoT devices 104A-104B and servers 240 and 260 can occur via a virtual private network (VPN), Secure Shell (SSH) tunnel, or other secure network connection. In some aspects, network 106 may further include a corporate network (e.g., intranet) and one or more wireless access points.

Wireless local area networks 202A-202B can include, but is not limited to, a computer network that covers a limited geographic area (e.g., a home, school, computer laboratory, or office building) using a wireless distribution method (e.g., spread-spectrum or OFDM). Wireless client devices 104A-104B may associate with wireless access point 102A to access wireless local area network 106 using WiFi™ standards (e.g., IEEE 802.11). Wireless access point 102A may include other network components in addition to a wireless access point. For example, wireless access point 102A may include a router, switch, bridge, broadband modem etc. According to aspects of the subject technology, wireless access point 102A is a wireless router that provides both access point functionality and network routing functionality.

Server 240 may be any system or device having a processor, a memory, and communications capability for providing content and/or services to the IoT devices 104A-104B, 104E and 104J. In some example aspects, the server 240 can include a single computing device 244, for example, or can include more than one computing device working together to perform the actions of a server (e.g., cloud computing, server farm). Further, the server 240 can represent various forms of servers including, but not limited to, a web server, an application server, a proxy server, etc.

Similarly, server 260 may be any system or device having a processor, a memory, and communications capability for providing content and/or services to the IoT devices 104A-104B, 104E and 104J. In some example aspects, the server 260 can be a single computing device 264, for example, or can include more than one computing device working together to perform the actions of a server (e.g., cloud computing, server farm). Further, the server 260 can represent various forms of servers including, but not limited to, a web server, an application server, a proxy server, etc.

A cloud-based service may include services provided by one or more servers, such as server 240 and server 260, via one or more networks, such as network 106. Cloud-based services may require authentication of user account credentials for access via a cloud-based application, such as a web-based personal portal, a web-based email application, etc. A cloud-based service has access to computer-readable storage devices 242 and 262 and may store information or data of a user once the user account credentials are authenticated. The stored data or information is also available to the user for future access and possible manipulation via other applications that are employed by the user.

Each of IoT devices 104A-104B, 104E and 104J, may represent various forms of processing devices. By way of illustration only and not by way of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

As depicted in FIG. 2A, IoT devices 104A-104B, WiFi™ enabled devices, connect and communicate with the wireless access point 102A using wireless links. These wireless links may be established and managed using various protocols including the IEEE 802.11 protocols. The IoT devices 104A-104B may communicate wirelessly through a communication interface (not shown), which may include digital signal processing circuitry. In addition to the IEEE 802.11 protocols, the communication interface may provide for communications under other modes or protocols such as, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

According to aspects of the subject technology, IoT device 104B is a new device and/or an IoT device that requires access to wireless local area network 202A. A user will initiate a HMI within IoT device 104A (e.g., a smart phone device). The HMI accepts an entry from the user, via a user interface, in the form of credentials to access the wireless local area network 202A. The credentials maybe an SSID and a passphrase to enable access to wireless local area network 202A via WAP 102A. The HMI initiates a request to send the SSID and the passphrase as a UDP packet(s). IoT device 104A sends a UDP packet(s) to WAP 102A, where in the UDP packet(s) includes the SSID and the passphrase to access to wireless local area network 202A. The WAP 102A re-transmits the UDP packets within the wireless local area network 202A. IoT device 104B receives the UDP packets and processes the packets according to a predefined-instruction within the IoT device 104B to extract the SSID and passphrase from the UDP packets. The IoT device 104B sends a request to WAP 102A to join the wireless local area network 202A. IoT device 104B joins the wireless local area network 202A once the passphrase and the SSID is authenticated by WAP 102A.

Figure 2B:
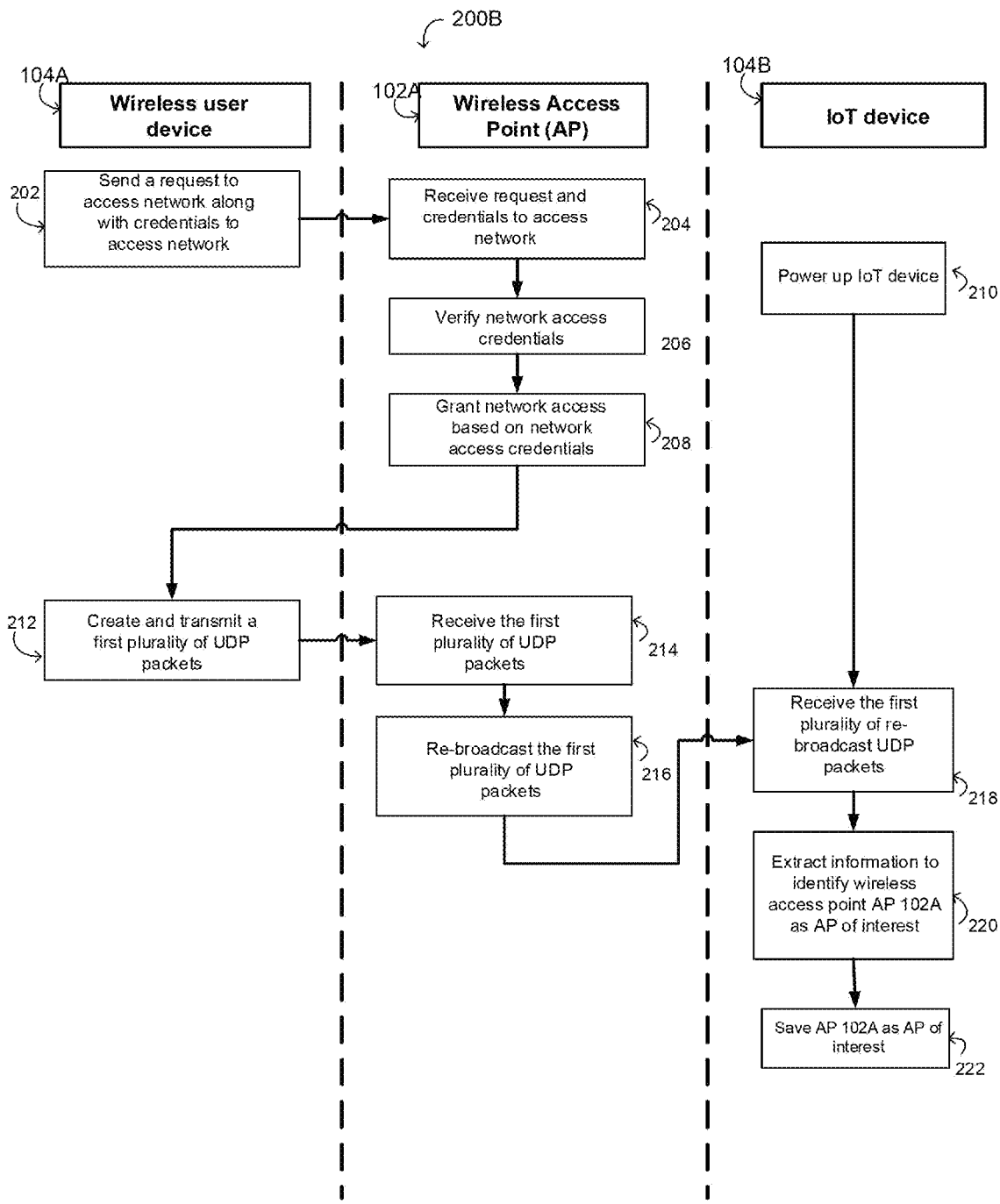
FIG. 2B illustrates an exemplary flow chart of a process to identify an access point of interest in accordance with one or more embodiments of the present disclosure.

FIG. 2B illustrates an exemplary flow chart off process 200B to identify an access point of interest 102A in accordance with one or more embodiments of the present disclosure. For explanatory purposes, the example process 200B is described herein with reference to wireless access point 102A, wireless, client device 104A, and IoT device 104B of FIGS. 1-2A; however, the example process 200B is not limited to wireless access point 102A, wireless client device 104A, and IoT device 104B of FIGS. 1-2A, and the example process 200B may be performed by one or more components of wireless access point 102A, wireless client device 104A, and IoT device 104B. Further for explanatory purposes, the blocks of the example process 200B are described herein as occurring in serial, or linearly. However, multiple blocks of the example process 200B may occur in parallel. In addition, the blocks of the example process 200A may be performed a different order than the order shown and/or one or more of the blocks of the example process 200B may not be performed.

Wireless access point 102A broadcasts a message indicating availability for authentication based on network access credentials. The broadcast message may be a beacon signal announcing the presence of the wireless access point 102A and including information about the wireless local area network associated with the wireless access point 102A such as a network identifier (e.g., SSID). In block 402, wireless user device 104A sends a request to wireless access point 102A to access the wireless local area network. The request includes network access authentication information including SSID and passphrase. In block 204, upon receiving the request to join the wireless local area network, the WAP 102A authenticates the provided SSID and passphrase in block 206 and grants access to the wireless local area network based on the authentication in block 208.

According to aspects of the subject technology, wireless client device 104A initiates a process to identify wireless access point 102A as a wireless access point of interest. In block 212, the wireless client device 104A creates a plurality of UDP packets. The lengths of the UDP packets is defined according to a mathematical formula. For example, the mathematical formula might be 2 multiplied by n (2*n) where n takes the values n=1, 2, 3, 4. Another example for the mathematical formula is 2 raised to the power n, where n takes the values n=2, 4, 6 or n=3, 5, 7. For example, by way of illustration only and not by way of limitation, choosing the mathematical formula as 2*n where n=1, 2, 3 and 4, yields lengths of 2, 4, 6 and 8. The plurality of UDP packets created are four UDP packets, where the first packet is 2 bytes longer than a no-payload packet (where a no-payload packet is packet with no payload bytes), the second packet is 4 bytes longer than the no-payload packet, the third packet is 6 bytes longer than the no-payload packet and the fourth packet is 8 bytes longer than the no-payload packet. Accordingly, the four UDP packets have four different lengths (a+2), (a+4) (a+6) and (a+8) where a is the length of the no-payload packet. Upon the creation of the plurality of the UDP packets, the plurality of the UDP packets are transmitted as wireless signals.

In block 214, wireless access point 102A receives the plurality of the UDP packets and re-broadcast the UDP packets as indicated in block 216. IoT device 104B once powered up (e.g., either for the first time and/or via a dedicated reset button), as depicted in block 210, receives the plurality of UDP packets broadcasted by WAP 102A as depicted in block 218. In block 220, the IoT device 104B extracts the network access credentials from the plurality of UDP packets utilizing a predetermined set of instructions. In one or more implementations, the SSID is not included in the UDP packets. The IoT device 104B extracts the basic service set identifier (BSSID) from the UDP packets and employs the BSSID to identify the SSID associated with the BSSID. For example, the BSSID is usually included in the management frame or data frame of a packet. The IoT device 104B extracts the BSSID from the UDP packets it receives and scan all beacon signals it receives for a match. Once a match is found, the SSID is extracted from the beacon frame of a beacon signal of nearby access points broadcasting their availability via beacon signals. Once the SSID is identified the IoT device 104B sends a request to the matched access point (e.g., WAP 102A) requesting access to the wireless local area network using the extracted passphrase and the identified SSID. In some aspects, the UDP packets are encrypted before transmission by device 104A and a decryption capability is utilized on the receiving IoT device 104B to extract the raw data within the UDP packets.

In some aspects, IoT device 104B has previous knowledge of the mathematical formula utilized when creating the plurality of the UDP packets. The knowledge of the mathematical formula is utilized on the received plurality of UDP packets to identify wireless access point 102A as a wireless access point of interest, as depicted in block 222. In one or more implementations, identifying wireless access point 102A as a wireless access point of interest yields a fixed number associated with the wireless access point of interest.

In one or more implementations the fixed number is denoted as a and is given by the length of the no-payload packet.

Figure 3:
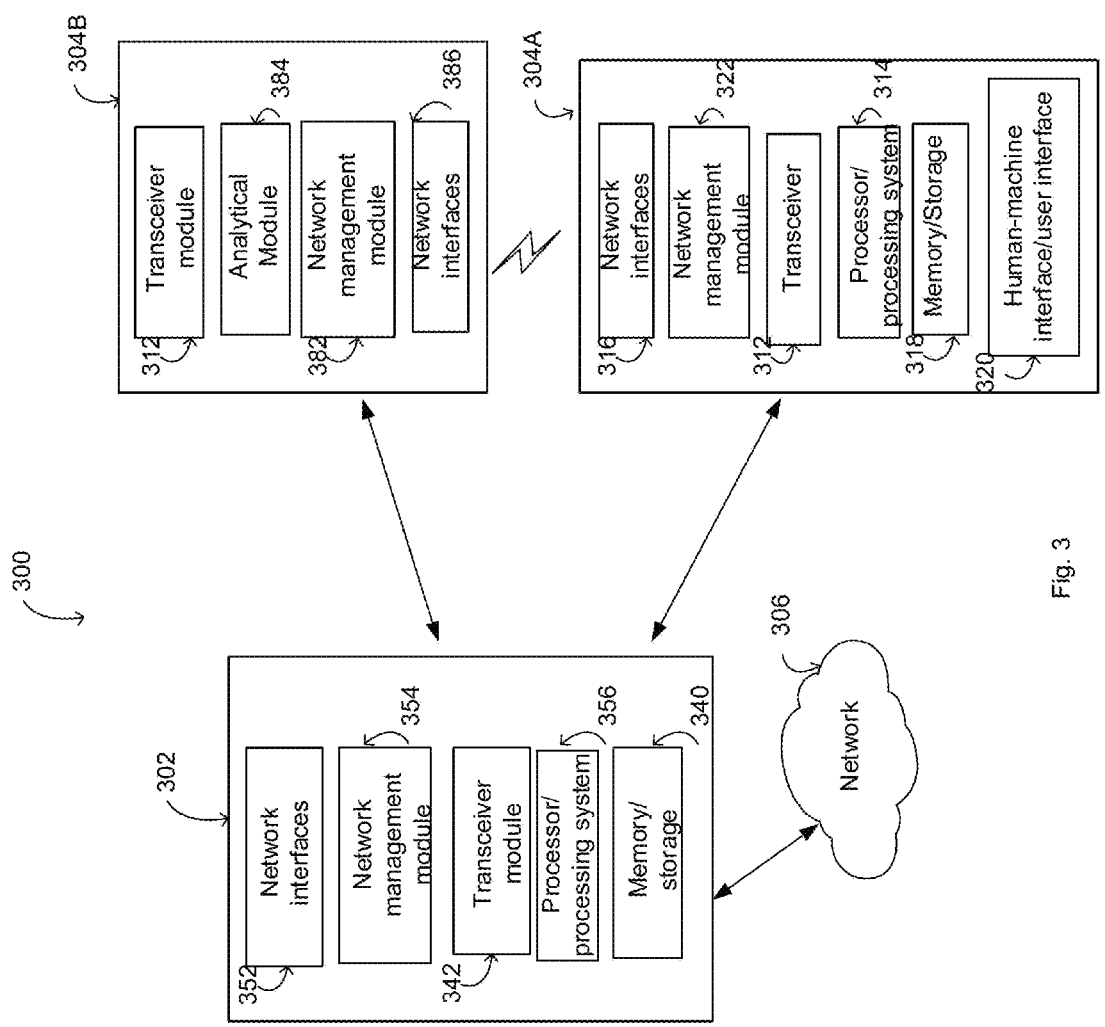
FIG. 3 illustrates an exemplary IoT devices, network wireless access point and network in accordance with one or more embodiments of the present disclosure.

FIG. 3 illustrates an exemplary IoT devices 304A and 304B, network wireless access point 302 and network 306 similar to the IoT devices 104A and 104B, wireless access point 102A-102B and network 106 of FIG. 2A, respectively, in accordance with one or more embodiments of the present disclosure. Not all of the components depicted in the figure may be used, however, and one or more implementations may include additional components not shown in the figure. Variations in the arrangement and type of the components may be made without departing from the scope of the subject technology. Additional components, different components, or fewer components may be provided.

IoT device 304A, depicted as a wireless user device, includes processor/processing system 314, memory/storage 318, transceiver 312, HMI application 320, network interfaces 316, network management module 322. Memory/storage 318 may include a dynamic random-access memory (DRAM) and/or a read-only memory (ROM). memory/storage 318 may provide a temporary location to store data and instructions retrieved and processed by processor/processing system 314. memory/storage 318 may include a non-volatile read-and-write memory that stores data and instructions retrieved and processed by processor/processing system 314. For example, memory/storage 318 may include magnetic, solid state and/or optical media.

Processor/processing system 314 may retrieve and execute instructions from memory/storage 318, in order to perform the processes of the subject disclosure. Processor/processing system 314 can be a single processor, a multi-core processor, or multiple processors in different implementations. HMI application 320 and network management module 322 may include one or more sets of instructions stored in memory/storage 318 that, when executed by processor/processing system 314, cause processor/processing system 314 to perform operations described herein.

HMI application 320 may be configured to receive and authenticate user credentials for a WAP 302, the HMI 320 may receive an SSID and a passphrase from a user. HMI application 320 requests a UDP packets from network management module to be sent to a WAP such as 302 where the UDP packets are programmed to aid in identifying an access point as an access point of interest. In some aspects, HMI application 320 requests a UDP packets from network management module 322 including the authenticating user credentials to be sent to a WAP such as 302 to aid an IoT device 304B in joining the local area wireless network. Network management module 322 manages IoT device 304A device communications with network interfaces 316 and HMI 320. In some aspects, network interface 316 is a machine-interface.

Wireless access point 302 includes processor/processing system 356, transceiver 342, network interface 352, network management module 354 and memory/storage 340. Wireless access point 302 may establish a network connection with IoT device 304A via network interfaces 352. Memory/storage 340 may include a dynamic random-access memory (DRAM) and/or a read-only memory (ROM). Memory/storage 340 may provide a temporary location to store data and instructions retrieved and processed by processor/processing system 356. Memory/storage 340 may include a non-volatile read-and-write memory that stores data and instructions, even when wireless access point 302 is off, that may be retrieved and processed by processor/processing system 356. For example, memory/storage 340 may include magnetic, solid state or optical media.

Processor/processing system 356 may retrieve and execute instructions from Memory/storage 340 in order to perform the processes of the subject disclosure. Processor/processing system 356 can be a single processor, a multi-core processor, or multiple processors in different implementations. Network management module 354 may include one or more sets of instructions stored in Memory/storage 340 that may include instructions that, when executed by processor/processing system 356, cause processor/processing system 356 to perform operations described herein.

Network interface 352 and network management module 354 may be configured to manage the process of associating IoT devices 304A-304B with wireless access point 302. In some aspects, network interface 352 is a machine-interface. For example, network management module 354 may broadcast availability of the wireless access point 302 in a beacon signal and reply to authentication and accessing the wireless local area network requests received from wireless client devices (e.g., IoT devices 104A-104B) according to connection protocols such as the 802.11 protocols and variations described herein. In, response to authentication requests from IoT devices 104A-104B, network management module 354 authenticates the network access credentials and, upon authentication, the network management module 354 grants IoT devices 304A and 304B access to WAP 302.

IoT device 304B, depicted as an IoT device to be joined into the WAP 302 network, includes analytical module 384, transceiver module 312, network management module 382 and network interfaces 386. In some aspects, network interface 386 is a machine-interface. Network management module 382 and network interfaces 386 may be configured to, manage the discovery of wireless local area networks, identifying an access point within the wireless local area network as an access point of interest. Network management module 382 and network interfaces 386 may be configured to manage the association process between the IoT device 304B and the discovered wireless local area networks. Upon discovery of a wireless access point that supports and accepts the network access credentials as described herein, the network management module 382 may send a request to join WAP 302 network.

Analytical module 384 may include a memory/storage and processor similar to memory/storage 318 and processor/processing system 314 of IoT device 304A. Analytical module 384 utilizes a processor and may retrieve and execute instructions from memory/storage unit within the analytical module 384, in order to perform the processes of the subject disclosure. According to aspects of the subject technology analytical module 384 receives the UDP packets from WAP 302, analyze the packets, and identify WAP 302 as an access point of interest. In one or more implementations, analytical module 384 receives the UDP packets from WAP 302, analyze the packets, extract the passphrase from the UDP packet and follow a routine to request joining WAP 302.

Figure 4A:
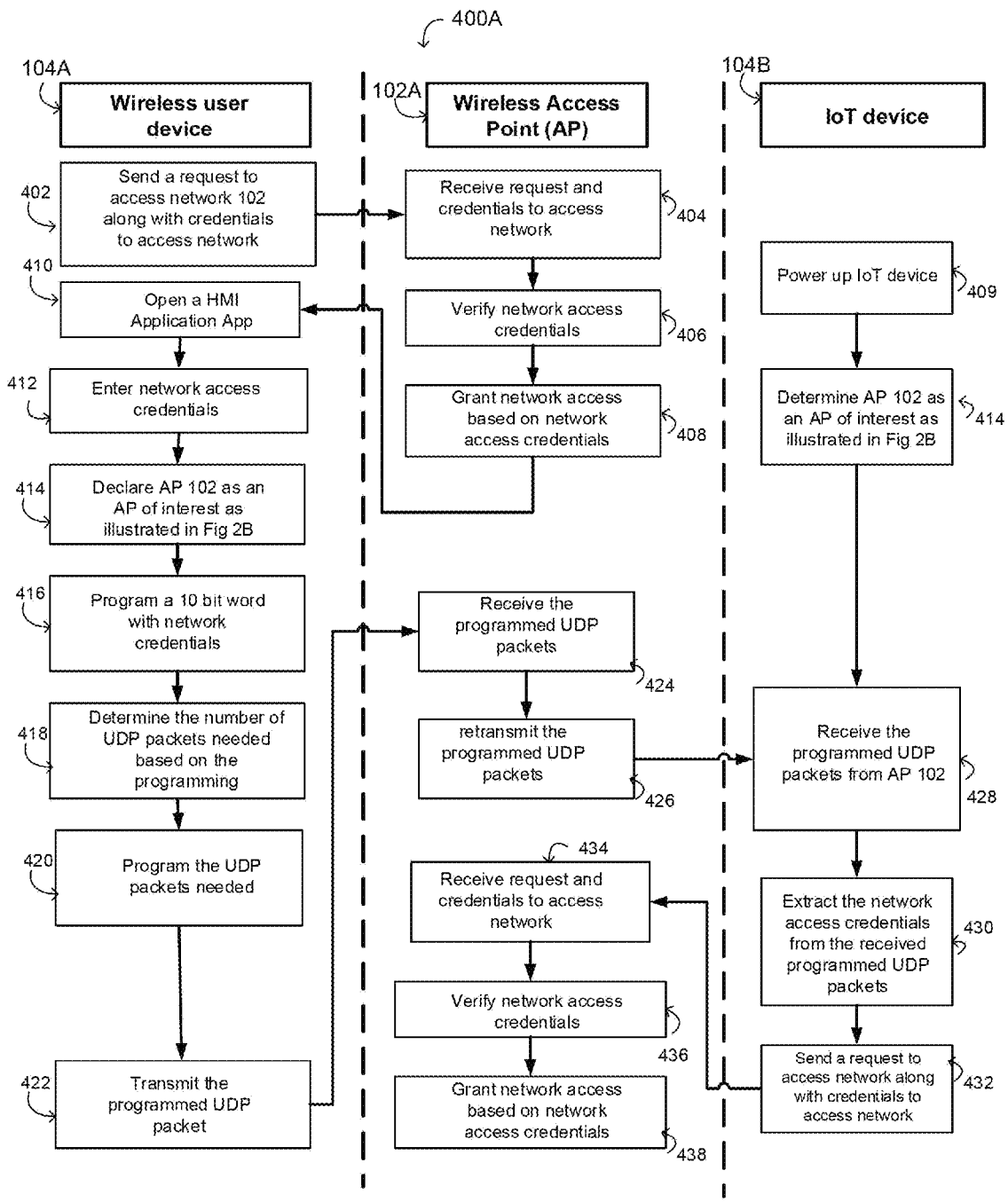
FIG. 4A illustrates an exemplary flow chart of process to enable an IoT device to access a wireless local area access network in accordance with one or more embodiments of the present disclosure.

FIG. 4A illustrates an exemplary flow chart of process 400A to enable an IoT device to access a wireless local area access network in accordance with one or more embodiments of the present disclosure. For explanatory purposes, the example process 400A is described herein with reference to wireless access point 102A, wireless client device 104A, and IoT device 104B of FIG. 2A; however, the example process 400A is not limited to wireless access point 102A, wireless client device 104A, and IoT device 104B of FIG. 2A, and the example process 400A may be performed by one or more components of wireless access point 102A, wireless client device 104A, and IoT device 104B. Further for explanatory purposes, the blocks of the example process 400A are described herein as occurring in serial, or linearly. However, multiple blocks of the example process 400A may occur in parallel. In addition, the blocks of the example process 400A may be performed a different order than the order shown and/or one or more of the blocks of the example process 400A may not be performed.

Wireless access point 102A and wireless access point 102B broadcasts a message indicating availability for authentication based on network access credentials. The broadcast message may be a beacon signal announcing the presence of the wireless access point 102A and wireless access point 102B and including info illation about the wireless local area network associated with the wireless access point 102A and wireless access point 102B such as a network identifier (e.g., SSID). In block 402, wireless user device 104A sends a request to wireless access point 102A to access the wireless local area network. The request includes network access authentication information including SSID and/or passphrase. In block 404, upon receiving the request to join the wireless local area network, the WAP 102A authenticates the provided SSID and passphrase in block 406 and grants access to the wireless local area network based on the authentication in block 408.

A user may have a new IoT device 104B that needs to be part of the wireless local area network, or the IoT device 104B may be an existing IoT device that has lost connection to the wireless local area network. Accordingly, the user may initiate the process of adding the IoT device 104B to the network by utilizing an HMI application as depicted in block 410. The user enters the network access credentials (e.g., SSID and passphrase) manually through the HMI application as depicted in block 412. In one or more implementations, IoT device 104B is within the network coverage of more than one access point such as wireless access point 102A and wireless access point 102B. Accordingly, in block 414, wireless user device 104A declares wireless access point 102A as the wireless access point of interest and executes the steps shown in FIG. 2B to communicate the declaration to IoT device 104B.

In block 416, wireless user device 104A programs a 10-bit word with network credentials along with other management words such as CRC information words. Further, in block 418 a number of UDP packets is determined to represent the full passphrase of the network access credentials. More details of steps in block 416 and 418 are described in FIG. 4B. In block 420 the UDP packets are programed according to the steps in FIG. 4B and the programed UDP packets are transmitted by wireless user device 104A as depicted in block 422.

In some aspects, wireless access point 102A receives the programmed UDP packets as depicted in block 424. In block 426, the wireless access point 102A retransmits the received programmed UDP packets as, for example, broadcast packets, unicast packets or multicast packets. According to aspects of the subject technology, the IoT device 104B once powered up (e.g., either for the first time and/or via a dedicated reset button), as depicted in block 409, receives UDP packets from WAP 102A and determines according to the steps illustrated in FIG. 2B, WAP 102A as a wireless access point of interest as depicted in block 414. In one or more implementations, IoT device 104B receives the programed UDP packets broadcasted by WAP 102A as depicted in block 428. In block 430, the IoT device 104B extracts the network access credentials from the UDP packets utilizing a predetermined set of instructions.

According to aspects of the subject technology, the IoT device 104B sends a request to WAP 102A to access the wireless local area network utilizing the extracted network access credentials as depicted in block 432. The WAP 102A receives the request and the network credentials to join the wireless local area network as depicted in block 434. The WAP 102A then authenticates the network access credentials in block 436 and grants access to IoT device 104B, upon authentication, to the wireless local area network as depicted in block 438.

Figure 4B:
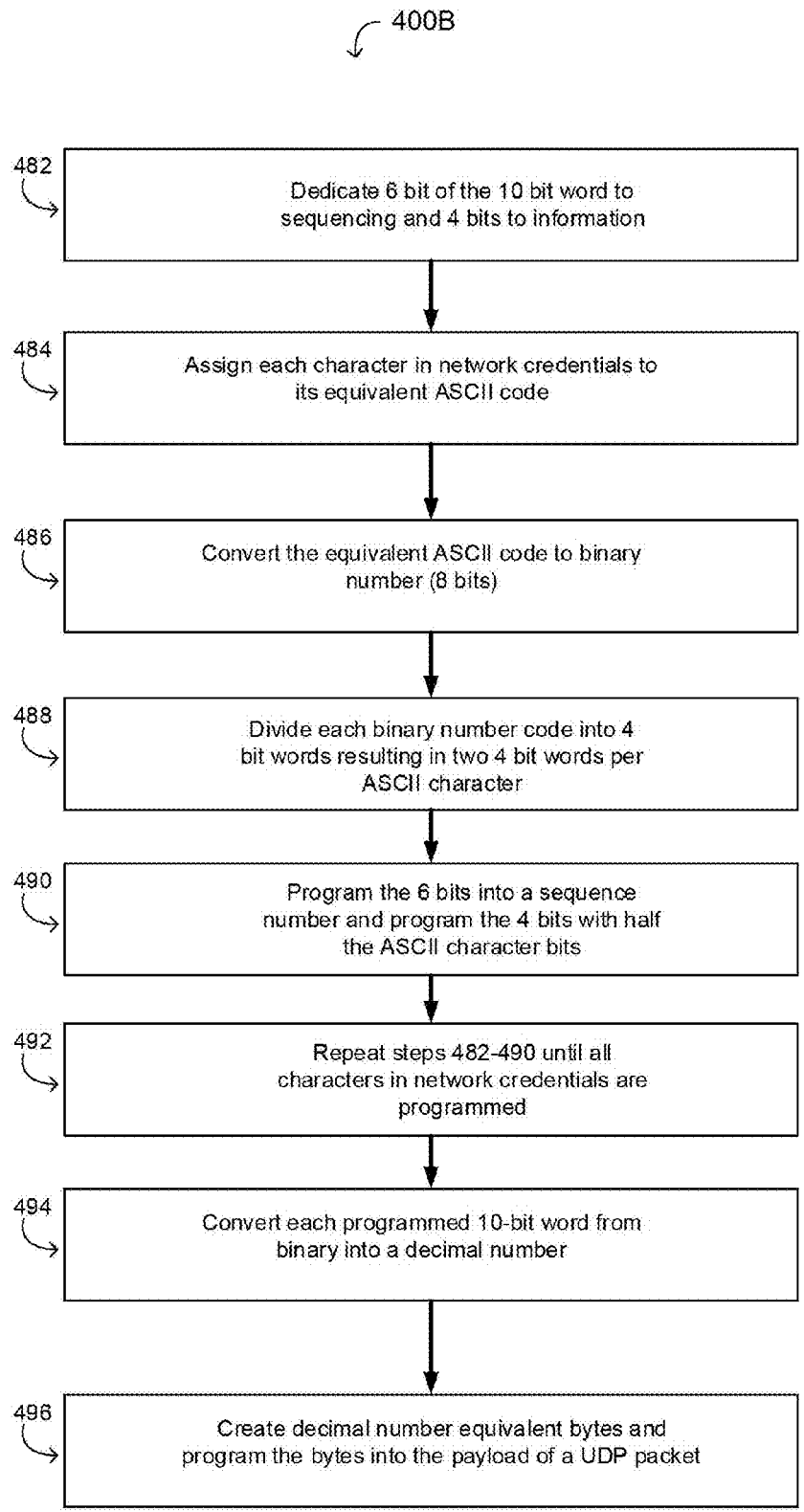
FIG. 4B illustrates an, exemplary flow chart to create a plurality of packets indicative of wireless network access credentials in accordance with one or more embodiments of the present disclosure.

FIG. 4B illustrates an exemplary flow chart 400B to create a plurality of packets indicative of wireless network access credentials in accordance with one or more embodiments of the present disclosure. flow chart 400B is an exemplary method on how to perform block 416, block 418 and block 420 as depicted in FIG. 4A according to aspects of the present technology. For example, by way of illustration only and not by way of limitation, to program a 10-bit word; 6 bits are dedicated to sequencing of the word and 4 bits are dedicated to information where the information is for example partial or full representation of characters of the network access credentials as depicted in block 482.

In one or more implementations, in block 484, characters of the network access credentials are encoded (e.g., using an American Standard Code for Information interchange (ASCII) encoder). Each character ASCII code is assigned a hexadecimal number. The ASCII hexadecimal number is then converted to an 8-bit binary number as depicted in block 486. In block 488 the 8-bit binary number is divided into two half-words (i.e., 4 bit words each) where each ASCII character in presented by two half words. According to aspects of the technology, as depicted in block 490, each 10-bit word is programmed with 6 bits sequencing number and 4 bits representing the half word of the equivalent network access character. To illustrate, if the network access credentials has a letter "H". The ASCII code for the letter "H" is hexadecimal 48. Convening hex48 to a binary result in an 8-bit word equivalent to (0100 1000) where the least significant bit is the bit on the right. Accordingly, the letter "H" will be divided into two 4-bit words (i.e., 0100 and 1000) and it will require two 10-bit words to represent the letter "H". As depicted in block 492, all characters of the network access credentials are programmed by repeating blocks 486-490.

In some aspects, the programmed 10-bit binary words from block 492 are converted to the decimal numbers as depicted in block 494. In one or more implementations, each 10-bit word equivalent decimal number is a number of payload bytes to be generated by wireless user device 104A. The payload bytes are programed as place-holder into a UDP packet in preparation for transmission. The total length of the programed UDP packet is the fixed length of the UDP packet, decided by the wireless standard utilized to generate the UDP packets, plus the payload bytes, determined according to block 496. In one or more implementations, the fixed length is the fixed number associated with the access point of interest.

Figure 4C:
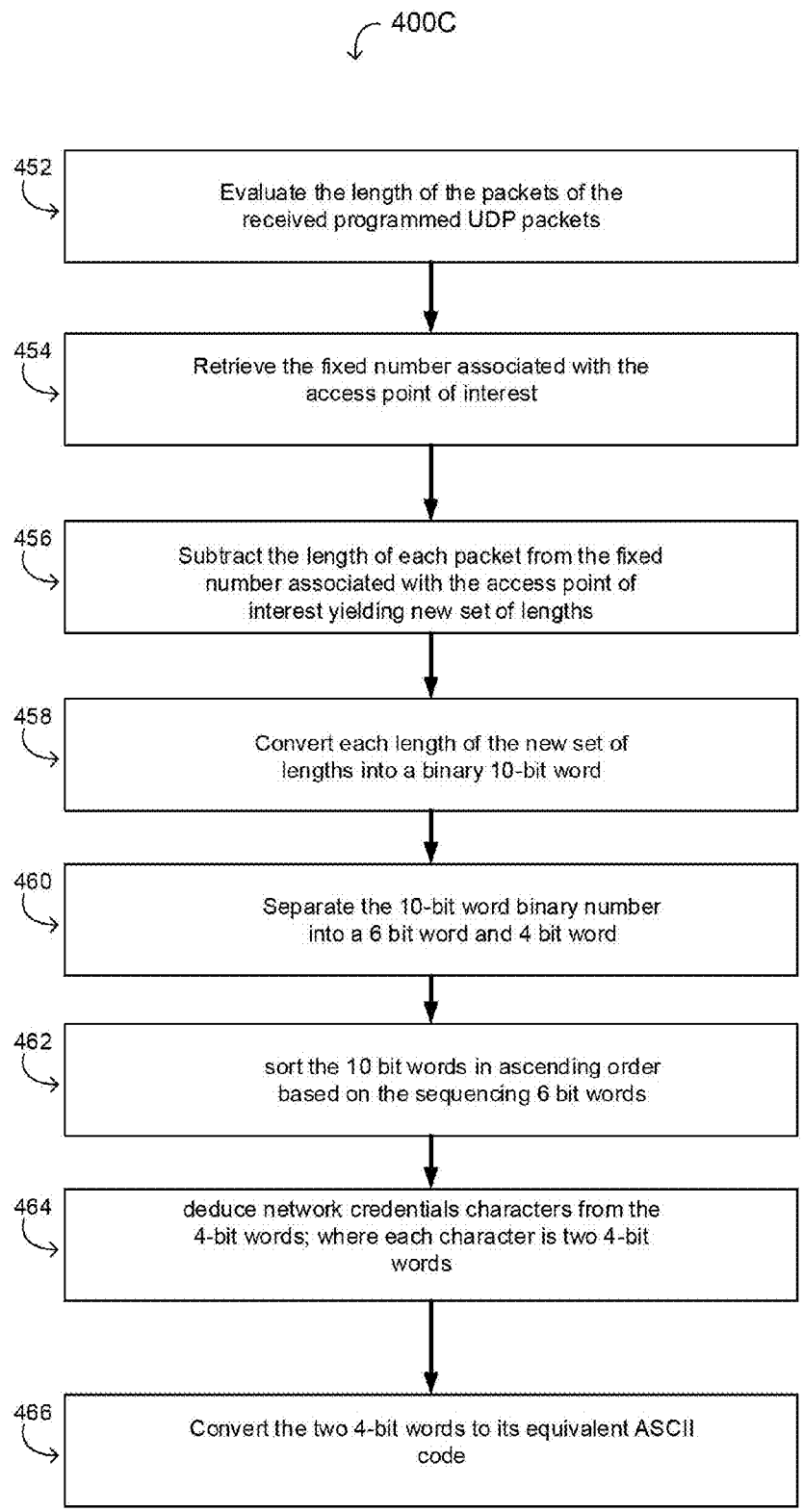
FIG. 4C illustrates an exemplary flow chart to extract network access credentials from programmed UDP packets in accordance with one or more embodiments of the present disclosure.

FIG. 4C illustrates an exemplary flow chart 400C to extract network access credentials from programmed UDP packets in accordance with one or more embodiments of the present disclosure. flow chart 400C is an exemplary method on how to perform block 430 as depicted in FIG. 4A according to aspects of the present technology. For example, by way of illustration only and not by way of limitation, upon reception of the programmed. UDP packets by IoT device 104B, the length of each packet of the received packets is determined as depicted in block 452. In block 454, the fixed number associated with the wireless access point of interest is retrieved, and the fixed number is subtracted from each packet length of all the received packets, yielding a new set of lengths, as depicted in block 456. Each length within the new set of lengths is converted into a 10-bit word as depicted in block 458. Further, in block 460, each 10-bit word is divided into 6-bit words and 4-bit words.

The words are sorted in an ascending order based on the 6-bit sequencing words as depicted in block 462. In one or more implementations, the network access characters are deduced from the remaining 4-bit words of the 10-bit words, as depicted in block 464. Each character is constructed from two consecutive 4-bit words and each two consecutive 4-bit words are then converted into an equivalent ASCII code to represent the character, as depicted in block 466. In one or more implementations, the 1 byte of total length of the packet, the 2 bytes of the length of the passphrase from a wireless access credentials, the 2 bytes to a cyclic redundancy check are identified to aid in sorting the received UDP packets and the extraction of the characters of the network access credentials.

In one or more implementations, the SSID is not included in the UDP packets. The IoT device 104B extracts the basic service set identifier (BSSID) from the UDP packets and employs the BSSID to identify the SSID associated with the BSSID. For example, the BSSID is usually included in the management frame or data frame of a packet. The IoT device 104B extracts the BSSID from the UDP packets it receives and scan all beacon signals it receives for a match. Once a match is found, the SSID is extracted from the beacon frame of a beacon signal of nearby access points broadcasting their availability via beacon signals. Once the SSID is identified the IoT device 104B sends a request to the matched access point (e.g., WAP 102A) requesting access to the wireless local area network using the extracted passphrase and the identified SSID. In some aspects, the UDP packets are encrypted before transmission by device 104A and a decryption capability is utilized on the receiving IoT device 104B to extract the raw data within the UDP packets.

FIG. 5 illustrates conceptually an example electronic system 500 with which some implementations of the present disclosure may be implemented. Electronic system 500 may be a gateway device, a set-top box, a computer (e.g., desktop computer or laptop computer), a phone, a personal digital assistant (PDA), a server, a switch, a router, a base station, a receiver, or any other sort of electronic device that transmits signals over a network, such as electronic devices embedded in smart appliances and other smart systems. The electronic system 500 may be, and/or may be a part of, the proxy device and/or one or more of the smart devices. For example, the electronic system 500 may be a sensor, an active device, and/or an actuator. Such an electronic system includes various types of computer readable media and interfaces for various other types of computer readable media.

The electronic system 500 may include a processor 510 such as a processor 314 and processor/processing system 356 and analytical module 384 as depicted in FIG. 3. The processor 510 may be coupled to a computer-readable storage medium, such as a memory 532 (e.g., a non-transitory computer-readable medium), via a transceiver 550. The transceiver 550 may correspond to transceiver 312 and transceiver 342 as depicted in FIG. 3. Moreover, as depicted in FIG. 5, the processor 510 may be external transceiver 550. For example, the processor 510 may be "off-chip" with respect to the transceiver 550. In another embodiment, the processor 510 and the transceiver 550 are integrated within a system-in-package or system-on-chip device 522, as explained further below.

The memory 532 may store instructions 554 that are executable by the processor 510, data 556 that is accessible to the processor 510, or a combination thereof. In a particular embodiment, the memory 532 is a volatile memory that is accessible to the processor via transceiver 550. FIG. 5 also shows a display controller 526 that is coupled to the processor 510 and to a display 528. A coder/decoder (CODEC) 534 may also be coupled to the processor 510. A speaker 536 and a microphone 538 may be coupled to the CODEC 534. FIG. 5 also indicates that a wireless controller 540 may be coupled to the processor 510. The wireless controller may be further coupled to an antenna 542 via a transceiver 550. A camera 546 may be coupled to a camera controller 590. The camera controller 590 may be coupled to the processor 510.

In a particular embodiment, the processor 510, the memory 532, the display controller 526, the camera controller 590, the CODEC 534, the wireless controller 540, and the transceiver 550 are included in the system-in-package or system-on-chip device 522. An input device 530 and a power supply 544 may be coupled to the system-on-chip device 522. Moreover, in a particular embodiment, and as illustrated in FIG. 5, the display 528, the input device 530, the camera 546, the speaker 536, the microphone 538, the antenna 542, and the power supply 544 are external to the system-on-chip device 522. However, each of the display 528, the input device 530, the camera 546, the speaker 536, the microphone 538, the antenna 542, and the power supply 544 may be coupled to a component of the system-on-chip device 522. As a particular example, the processor 510 and the memory 532 are coupled to transceiver 550.

In connection with the present disclosure, a computer-readable storage medium (e.g., the memory 532) stores data (e.g., the data 556) that is accessible to a processor (e.g., the processor 510) during modes of operation of transceiver 550. The data 556 may be a method instruction as depicted in FIG. 2B, FIG. 4A and FIG. 4B. The method instructions are executable by processor 510, where the instructions include steps on how to operate and configure the transceiver 550. Finally, as depicted in FIG. 5, electronic system 500 couples to a network through a network interface 516. In this manner, the electronic system 500 may be a part of a network of computers (for example, a local area network (LAN), a wide area network (WAN), or an Intranet, or a network of networks, for example, the Internet. Any or all components of electronic system 500 may be used in conjunction with the subject disclosure. The network interface 516 may include cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication.

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the electronic system 500, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation, decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A wireless user device for adding an Internet of Things (IoT) device to a local area network, the wireless user device comprising:
    a human-machine interface (HMI) system, the HMI comprising:
    a user interface configured to receive a user input from a user of the wireless user device, wherein the user input comprises network access credentials of an access point of a local area network previously received by the access point;
    a processing system, comprising one or more processors, the one or more processors configured to identify the access point as an access point of interest, wherein to identify the access point as an access point of interest, the one or more processors creates a first plurality of user datagram protocol (UDP) packets, wherein a respective length of each of the first plurality of UDP packets is defined according to a mathematical formula known to both the wireless user device and the IoT device; and
    a transmitter, configured to broadcast the first plurality of the UDP packets to the access point of interest such that, upon reception of the first plurality of UDP packets, the access point of interest either unicasts, multicasts, or broadcasts a retransmission of the first plurality of UDP packets to the IoT device.

2. The system of claim 1, wherein the wireless network access credentials comprise at least a passphrase word.

3. The system of claim 2, wherein, at the IoT device, a service set identifier (SSID) word for the access point of interest is determined from an extraction of a basic service set identifier (BSSID) of the access point of interest.

4. The system of claim 3, wherein the one or more processors are further configured to:
    create a second plurality of UDP packets; and
    broadcast the second plurality of UDP packets to the access point, wherein the second plurality of the UDP packets yields the network access credentials.

5. The system of claim 4, wherein to create a second plurality of UDP packets comprises programming a 10-bit word, wherein six bits of the 10-bit word are sequencing numbers bits, wherein 4 bits of the 10-bit word are information bits and wherein the network access credentials are ASCII code encoded.

6. The system of claim 5, wherein the ASCII code is converted to a binary 8-bit word and wherein the first 4 bits of the binary 8-bit word is programmed in the information bits.

7. The system of claim 6, wherein the programmed 10-bit word is converted into a decimal number and wherein the decimal number yields a number of bytes to be programmed within a payload of the second plurality of UDP packets.

8. The system of claim 7, wherein a plurality of lengths of the second plurality of UDP packets, when subtracted from a fixed number associated with the access point of interest, yields the network access credentials.

9. The system of claim 8, wherein the first plurality of the UDP packets when processed by the IoT device yields a fixed number and wherein the fixed number is associated with the access point of interest.

10. A method for adding an Internet of Things (IoT) device to a local area network comprising:
    receiving user input on a user interface of a wireless user device, wherein the user input comprises wireless network access credentials of an access point of a local area network previously received by the access point;
    creating a first plurality of user datagram protocol (UDP) packets to identify the access point as an access point of interest, wherein a respective length of each of the first plurality of UDP packets is defined according to a mathematical formula known to both the wireless user device and the IoT device;
    broadcasting the first plurality of UDP packets to the access point of interest such that, upon reception of the first plurality of UDP packets, the access point of interest either unicasts, multicasts, or broadcasts a retransmission of the first plurality of UDP packets;
    receiving, by the IoT device, the retransmitted first plurality of UDP packets; and
    processing the retransmitted first plurality of UDP packets, wherein the processing yields a fixed number and associating the fixed number with the access point of interest.

11. The method of claim 10, wherein the wireless network access credentials comprise at least a passphrase word.

12. The method of claim 11, wherein, at the IoT device, a service set identifier (SSID) word for the access point of interest is determined from an extraction of a basic service set identifier (BSSID) of the access point of interest.

13. The method of claim 12, further comprising:
    creating a second plurality of UDP packets, wherein the second plurality of the UDP packets yields the network access credentials;
    broadcasting the second plurality of UDP packets to the access point of interest;
    retransmitting the second plurality of UDP packets from the access point of interest;
    receiving, by the IoT device, the second plurality of UDP packets; and
    processing the second plurality of UDP packets and extracting the network access credentials.

14. The method of claim 13, wherein creating the second plurality of UDP packets comprises programming a 10-bit word, wherein six bits of the 10-bit word are sequencing numbers bits, wherein 4 bits of the 10-bit word are information bits and wherein the network access credentials are ASCII encoded.

15. The method of claim 14, wherein the ASCII code is converted to a binary 8-bit word and wherein the first 4 bits of the 8-bit word are programmed in the information bits.

16. The method of claim 15, wherein the programmed 10-bit word is converted into a decimal number and wherein the decimal number yields a number of bytes to be programmed within a payload of the second plurality of UDP packets.

17. The method of claim 16, wherein a plurality of lengths of the second plurality of UDP packets is subtracted from the fixed number associated with the access point of interest and wherein the subtraction result yields the network access credentials.

18. A non-transitory machine-readable medium comprising instructions stored therein, which, when executed by one or more processors of a processing system cause the one or more processors to perform operations for adding an Internet of Things (IoT) device to a local area network, the operations comprising:
receiving user input on a user interface of a wireless user device, wherein the user input comprises wireless network access credentials of an access point of a local area network previously received by the access point;
creating a first plurality of user datagram protocol (UDP) packets to identify the access point as an access point of interest, wherein a respective length of each of the first plurality of UDP packets is defined according to a mathematical formula known to both the wireless user device and the IoT device;
broadcasting the first plurality of UDP packets to the access point of interest such that, upon reception of the first plurality of UDP packets, the access point of interest either unicasts, multicasts, or broadcasts a retransmission of the first plurality of UDP packets;
creating a second plurality of UDP packets at the wireless user device, wherein the second plurality of the UDP packets yield the network access credentials; and
broadcasting the second plurality of UDP packets;
retransmitting the second plurality of UDP packets from the access point of interest;
receiving, by the IoT device, the second plurality of UDP packets; and
processing the second plurality of UDP packets and extracting the network access credentials.

19. The non-transitory machine-readable medium of claim 18, wherein the wireless network access credentials comprise at least a passphrase word.

20. The non-transitory machine-readable medium of claim 19, wherein, at the IoT device, a service set identifier (SSID) word for the access point of interest is determined from an extraction of a basic service set identifier (BSSID) of the access point of interest.

21. The non-transitory machine-readable medium of claim 20, wherein creating the second plurality of UDP packets comprises programming a 10-bit word, wherein six bits of the 10-bit word are sequencing numbers bits, wherein 4 bits of the 10-bit word are information bits and, wherein, the network access credentials are ASCII encoded.

22. The non-transitory machine-readable medium of claim 21, wherein the ASCII code is converted to a binary 8-bit word and wherein the first 4 bits of the 8-bit word are programed in the information bits.

23. The non-transitory machine-readable medium of claim 22, wherein the programmed 10-bit word is converted into a decimal number and wherein the decimal number yields a number of bytes to be programed within the payload of the second plurality of UDP packets.

24. The non-transitory machine-readable medium of claim 23, wherein processing the first plurality of UDP packets with prior knowledge of the mathematical formula yields a fixed number wherein the fixed number is associated with the access point of interest and wherein processing the second plurality of UDP packets yields the network access credentials.

25. The non-transitory machine-readable medium of claim 24, wherein a plurality of lengths of the second plurality of UDP packets is subtracted from the fixed number associated with the access point of interest and wherein the subtraction result yields the network access credentials.

* * * * *